Patented Aug. 5, 1941

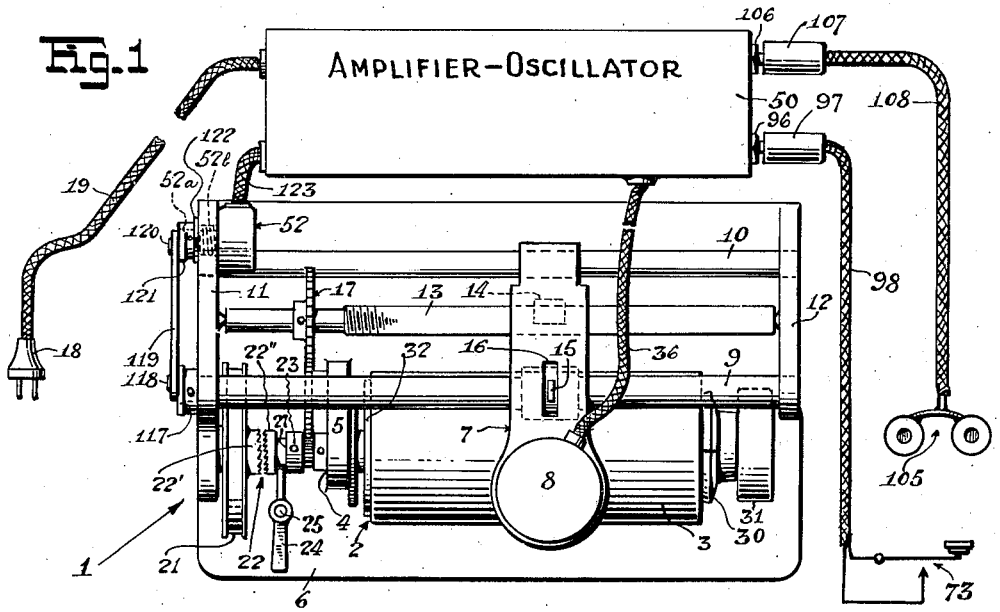

2,251,902

UNITED STATES PATENT OFFICE 2,251,902

CODE PRACTICE SET

Orville M. Dunning, Glen Ridge, N. J., assignor to Thomas A. Edison, Incorporated, West Orange, N. J., a corporation of New Jersey Application September 10, 1940, Serial No. 356,181

15 Claims. (Cl. 35—14)

This invention relates to code practice sets and more particularly to improvements therein adapted to simplify the construction and to facilitate the operation and control of such sets.

Code practice sets of the type herein illustrated and described are designed for use by students in learning the Morse Code. These sets are intended to serve as a means by which the student may reproduce or "listen-back" on his code practice exercises and thus note directly the quality of his work. Such procedure is very helpful to students in enabling them to acquire a high degree of proficiency in the sending as well as in the receiving of coded messages.

Code practice sets in their general form comprise as separate components thereof: a phonographic means conditionable for recording on and reproducing from a moving record as by way of a translating device typically of the electromechanical type; an audio signal generator connectable to feed into the translating device, as for the purpose of recording the signal, and controllable by a telegraph key, which key is operated by the student to start and stop the generator in the coding of his practice messages; and a suitable signal amplifying and sound receiving means connectable with the translating device to permit the student to listen back on the messages so coded. The control required over these separate components, to render the components operative and inoperative and to properly interconnect them to condition the set for the recordation and reproduction of code practice exercises, has encumbered the use of these sets and tended to distract the student's attention from the exercises themselves.

It is an object of my invention to provide a code practice set with such improvements and simplifications as will permit a student to operate the set—i. e., to variously condition the set for the performance of its different functions— with but a minimum of distraction of his attention from his code practice work; and more particularly, it is an object to provide control means by which the set may be selectively shifted into either of its respective conditions by the performance on the set of but a single manipulation. As a feature thereof, my invention is provided with means by which the oscillation generating means is connected to feed into the translating device as an incident of the conditioning of the device for recording, and by which the oscillation amplifying means is connected to feed from the translating device as an incident of the conditioning of the device for reproducing.

Another object of my invention is to cause the oscillation generating means to be rendered operable and the oscillation amplifying means to be rendered operative upon the placing of the translating device into respective operative conditions for recording and reproducing, and further to cause these oscillation means to be placed into inoperative condition when the translating device is restored to inoperative condition.

Still another object is to provide a key means which is effective to render the oscillation generating means operative and inoperative at will when the translating device is in recording condition but which is without influence on the set when the translating device is out of recording condition.

It is a further object of my invention to provide improvements and simplifications in the construction and arrangement of a code practice set which are adapted to permit the set to be built in a small and compact form and at a minimum cost; and a feature of my invention to this end is to provide the set with a single oscillation circuit means which is convertible to function either as an oscillation-generator or as an oscillation amplifier.

A yet further object of my invention is to effect this conversion of the oscillation circuit means as an incident of the placing of the translating device into its respective operative conditions.

Other and allied objects and features of my invention will more fully appear from the following description and the appended claims.

In the description of my invention reference is had to the accompanying drawing, of which:

Figure 1 is a partially diagrammatical view of a code practice set incorporating my invention; and Figure 2 is a view of circuits and mechanism of the set of Figure 1 as in accordance with my invention.

My invention is herein illustrated in connection with a phonographic unit 1 which by way of example is shown as of a type well known in the dictating machine art. This phonographic unit comprises a record support or mandrel 2 for carrying a cylindrical record 3, which mandrel is journalled as at 4 into an intermediate upright standard 5 of a frame 6. Overlying the mandrel is a carriage 7 which supports a record-cooperating translating device 8. This carriage is slidably mounted on front and back laterally extending rods 9 and 10 which are supported by left and right upright standards 11 and 12 provided on the frame 6. A driven movement of the carriage along the mandrel is effected by way of a feed screw 13 which is rotatably supported by the standards 11 and 12, the carriage being coupled to the feed screw typically by way of a feed nut 14. The engagement of the feed nut with the feed screw is controlled by a control lever 15 which slidably embraces the support rod 9 within the carriage (the control lever moves bodily with the carriage) and which projects upwardly through an opening 16 in the top wall of the carriage. The coupling between the control lever 15 and feed nut 14 may, for example, be of the form shown and described in Somers Patent No. 2,212,672, dated August 27, 1940, and entitled "Phonograph," and to which reference may be had for a description of the coupling in its details. For the present, however, the coupling is sufficiently described by the statement that it is arranged so that the feed nut and feed screw are held out of engagement when the control lever is in an intermediate or neutral position—the position occupied by the lever in the figures—but that the feed nut and feed screw are brought into engagement as the control lever is rocked either forwardly or rearwardly from such neutral position as into respective positions hereinafter referred to as the recording and reproducing positions of the lever.

The mandrel 2 and feed screw 13 are intercoupled by a train of gears 17 and rotated each with the other by a motor M, diagrammatically shown, which is adapted to be connected to a suitable power source by way of a plug 18 and power line 19 of which the latter serially includes an on-off switch 20 closeable and openable at will to start and stop the motor. The motor M has a driven connection to the mandrel shaft through a drive pulley 21, to which the motor is connected by a belt (not shown), and clutch 22 which connects the pulley 21 to the mandrel shaft and which comprises two toothed members 22' and 22" respectively carried by the pulley and mandrel shaft. The latter of these toothed members has a splined connection to the mandrel shaft, partially represented by the pin 23, to permit movement of this member into and out of engagement with the other. Movement of the toothed member 22" to engage and disengage the clutch is effected manually by way of a lever 24 pivoted as at 25 to the frame 6 and having its inner end portion in engagement with an annular groove 27 in the member 22".

The mandrel 2 is preferably provided with a record-holding and ejecting mechanism such, for example, as is disclosed in Gramann Patent No. 2,010,717, issued August 6, 1935, and entitled "Phonograph," and to which reference may be had for a description of this mechanism in all its details. Briefly stated, this mechanism comprises a chuck 30 at the right or open end of the mandrel which is expansible to grip and hold a record in mounted position on the mandrel, a knob 31 at the open end manipulatable to contract the chuck and release the record from the mandrel, and an ejecting head 32 at the left end of the mandrel which is biased rightwardly to eject the record from the mandrel when the record is released.

The translating device 8 is of an electromechanical type and comprises two main components: An electro-acoustical unit 34 operable either as a sound receiver or as a microphone and which may typically comprise a standard headphone, and an acousto-mechanical translating unit 35 such as is used in conventional dictating machines. During recording, the translating unit 34 receives electrical oscillations by way of conductors 36 and converts these oscillations into corresponding acoustical vibrations, which vibrations are transmitted by way of a tube 37 to the translating unit 35 and conversely, during reproducing, the translating unit 34 receives acoustical vibrations from the unit 35 and converts these vibrations into corresponding electrical oscillations, which oscillations are then transmitted from the unit by the conductors 36.

The translating unit 35—which, for example, is typically shown and described in detail in the aforementioned Somers patent—comprises recorder and reproducer styli 38 and 39 which are each lowerable from a raised position (see Figure 2) into engagement with the record. This unit is controlled in respect of the engagement of its styli with the record by the control lever 15 aforementioned. The control of the unit by the lever 15 is such that when the control lever is rocked forwardly into recording position the recorder stylus 38 is lowered onto the record and the unit is conditioned for recording; that when the control lever is rocked rearwardly into reproducing position the reproducer stylus 39 is lowered onto the record and the unit 35 is conditioned for reproducing; and that when the control lever is in neutral or inoperative position, both styli are held in raised position away from the record to render the unit 35 inoperative. When the unit is in recording condition it is effective to form a progressive groove on a moving record modulated in accordance with the sound vibrations transmitted thereto from the translating unit 34; and when the unit is in reproducing condition it is effective to generate sound vibrations in accordance with the modulations of such a record groove, as the groove is progressively tracked by the reproducer stylus, and to transmit these vibrations to the translating unit 34.

The structure and mechanism hereinabove described are common to phonographs of the dictating machine type as heretofore manufactured and used, and form a part of the present invention only in so far as they are related to or combined with other mechanism hereinafter described.

The signal generating means for the set and the means to amplify reproduced signals as for example to a power level sufficient to operate one or more headphones, comprises an oscillation unit 50 designated in Figure 1 as "amplifier-oscillator." While my invention does not contemplate any particular physical positioning of the oscillation unit 50 in relation to the phonographic unit 1, it does contemplate, as a feature thereof, the making of the unit 50 as small and economical as possible to permit a reduction in the overall size and cost of the code practice set. To this end I provide a combined form of oscillation unit wherein the elements for the signal generating means and those for the signal amplifying means are made nearly wholly common to each other. This is accomplished by connecting the elements of the unit to function either as an oscillator or as an amplifier by means of a multiple switch 52 as is hereinafter described.

The oscillation unit, which is schematically represented in Figure 2, comprises for its more basic elements an input transformer 53 having primary winding 53a and a secondary winding tapped to provide winding portions 53b and 53c;

an output transformer 54 having primary and second windings 54a and 54b, an electronic discharge or amplifying tube 55 of the so-called pentode type and a B-supply for the amplifying tube 55 comprising a rectifier 56 and filter unit 57 of which the latter is of the usual series-inductance shunt-capacitance type. The tubes 55 and 56 are of the unipotential cathode type and respectively have heaters 58 and 59 which are serially connected and supplied with heater current by way of the power supply line 19, one end of the serial heater arrangement being connected by a line conductor 60 directly to one side of the power supply line and the other end being connected through a voltage cut-down resistance 61 and then by way of a line conductor 62 to the on-off switch 20 aforementioned. For reference purposes in the description of this oscillation unit the line conductors 60 and 62 are hereinafter referred to as the low and high potential sides respectively of the power supply to the unit.

The plate of the amplifying tube 55 is supplied with anode current from the high potential side 62 of the power supply by way of a circuit 63 serially including the rectifier tube 56, the high potential side of the filter unit 57 and the primary winding 54a of the output transformer 54. A conductor 64 tapped from the circuit 63 at the place between the primary winding 54a and filter unit 57 provides current supply to the screen grid element of the tube 55. The cathode of the tube 55—and the suppressor grid element which is connected therewith—are connected through the usual self-biasing resistor 65 and decoupling condenser 66 and thence by way of a line conductor 67 to the low potential side 60 of the power supply to the unit. To this line conductor 67 is also connected the lower side of the filter unit 57. The grid of the tube 55 is connected in a circuit 68 which serially includes the secondary winding portion 53b of the input transformer 53 and which has a terminal connection with the low potential side 60, as by way of the conductor 67 just mentioned.

It will be recognized that the circuit arrangement just described constitutes the usual transformer coupled amplifier. This amplifier is however adapted to be converted into a signal oscillator and for this reason there is provided a feedback circuit 69 from the plate back through the secondary winding portions 53c and 53b of the input transformer, which feedback circuit serially includes a voltage blocking condenser 70, a pair of terminals 71 and 71' and a feedback limiting resistor 72. Between the terminals 71 and 71' there is connected a telegraph key 73 in a manner hereinafter described, which key is adapted to serve as a means to close and open the feedback circuit at will, whereby to start and stop the signal oscillator as for coding purposes. In this feedback circuit there is obtained a 180° phase shift between the portions 53c and 53b of the secondary winding of the input transformer—which portions operate as an auto transformer. This 180° phase shift in conjunction with the 180° phase shift provided by the tube 55 provides the necessary in-phase relationship in the fed-back voltage to maintain sustained oscillations. The frequency of the oscillator signal is controlled by a condenser 74 connected in shunt across the portion 53b of the secondary winding of the input transformer, this frequency being typically of the order of 1000 cycles per second. The primary winding 53a performs no function in the oscillation unit when the unit functions as an oscillator.

The multiple switch 52 aforementioned—which is the means by which the circuit arrangement above described is connected either to function as an oscillator and to feed into the translating device 8 or to function as an amplifier and to feed from the translating device—is a four-pole three-position switch which may for example constitute a standard form of rotary switch such as is indicated in Figure 1. This switch comprises four poles 75, 76, 77 and 78 and four respectively associated sets of contacts of which the respective sets each consist of three and are designated by the number of the associated pole with the addition of the letters a, b and c—for example the set of contacts associated with the pole 75 being 75a, 75b and 75c. The poles of the switch are adapted to be moved together in unison with each other as into selective contact with their respective sets of contacts, their movement in unison being effected by reason of the poles being connected together insulatedly through a tieing or bridging means 79 schematically shown. When the poles are swung in a counter-clockwise direction into their terminal positions, they make connection with the contacts designated with the letter a and the switch is then in what is hereinafter termed its reproducing position. When the poles are swung in a clockwise direction into terminal position they make connection with the contacts provided with the letter c and the switch is then in what is hereinafter termed as its recording position; and when the poles are in their mid positions they respectively make connection with the contacts provided with the letter b and the switch is then in its so-called inoperative position.

The pole 75 controls the audio circuits of the code practice set—i. e., the switching of the translating device 8 between the input and output sides of the oscillation unit, as for reproducing and recording purposes respectively. The switching of these audio circuits is greatly simplified by providing the same with a common ground connection, thereby rendering it necessary to switch only the opposite or so-called live side of the audio circuits. This common ground connection is formed by way of a line conductor 80 which serves to connect one side of the input-output leads 36 of the translating device to the contact 75b, to one side of the primary winding 53a and to one side of the secondary winding 54b of the output transformer. The other one of the leads 36 from the translating device is connected to the pole 75. The terminal contact 75a—the one connected by the pole 75 when the switch 52 is in reproducing position—is connected by a conductor 81 to the live side of the primary winding 53a, this conductor serially including a variable resistance 82 provided for volume control purposes during reproducing. The other terminal contact 75c—the one contacted by the pole when the switch 52 is in recording position— is connected by a conductor 84 to a variable tap 85 on a resistance 86 which bridges the secondary winding 54b of the output transformer, this variable tap being provided for volume control purposes during recording. It will be seen that the two separate volume control means just mentioned are effective only to control the reproducing and recording functions, respectively of the oscillation unit. The resistance 86 may be, as a typical case, much higher than the characteristic impedance of the secondary winding 54b across which it connects.

The pole 76 constitutes the means by which the oscillation unit is converted into an oscillator or amplifier. The pole itself is connected by a conductor 90 to the terminal 71'—the terminal in the feedback circuit on the grid side; the contacts 76a and 76b are tied together and connected by a conductor 92 to the low potential side 60 of the oscillation unit; and the other contact 76c of this set is connected by a conductor 93 to one side of a jack 94, the other side of this jack being connected by conductor 95 to the terminal 71—the terminal in the feedback circuit on the plate side. The jack 94 which is mounted through insulation 96 on the casing 51 serves to make connection to the telegraph key 73 aforementioned, by way of a plug 97 and a two-conductor cable 98.

The pole 77 serves to connect a load resistance 99 across the secondary winding 54b of the output transformer, in shunt with the aforementioned resistor 86, when the oscillation unit is connected to function as an amplifier, this load resistance being provided for the purpose of loading the plate of the pentode tube 55 to a proper value so that the tube will function with a low distortion. This load to the tube is provided, when the switch 52 is in reproducing position, by way of a conductor 100 connecting contact 77a to the ground side 80 of the audio circuits, conductor 101 connecting the pole 77 to one side of the load resistance 99, and conductor 102 connecting the other side of the resistance 99 to the live side of the secondary winding 54b of the output transformer.

The pole 78 controls the output connections of the oscillation unit in relation to a sound receiving means such as a headphone 105, which headphones constitute the means by which the student listens to the oscillator signal during the coding of practice exercises, and thereafter to the reproduction of the recordation of such exercises. The connections of the headphones to the unit comprise a jack 106 mounted directly on the casing 51 for the unit, a plug 107 adapted to fit the jack and a cable 108 connecting the plug to the headphones. The ground side of the jack, which makes connection with casing 51 as at 109, is connected directly to the ground side 80 of the audio circuit; the other side of the jack is connected by a conductor 110 to the pole 78. The contacts 78a, 78b and 78c are connected respectively to the conductor 102 leading from the live side of the output secondary winding as abovementioned, to the ground side 80 of the audio circuits and to the volume control tap 85 aforementioned through a resistor 112. This resistor 112 is adapted to cut down the oscillator signal in the headphones during recordation.

From the foregoing description it will be seen that the functioning of the switch 52 is as follows: When the switch is in reproducing position the translating device 8 is connected by way of the pole 75 and contact 75a to feed into the input transformer 53; the feedback circuit 69 is broken (the secondary winding portion 53c and resistor 72 thereof being shorted by way of the pole 76 and contact 76a) to condition the oscillation unit to function as an amplifier; the load resistance 99 is connected across the secondary winding 54b of the output transformer to properly load the amplifier tube 55 as for the purpose heretofore mentioned; and the headphones 105 are connected across the secondary winding 54b of the output transformer by way of the pole 78 and contact 78a. When the switch 52 is in intermediate or inoperative position, the conductors 36 of the translating device 8 are short-circuited by way of the pole 75 and contact 75b and the cable 108 of the headphones 105 is short-circuited by way of the pole 78 and contact 78b, the feedback circuit 69 however remains open as in the foregoing case but the load resistance 99 is removed. When the switch 52 is shifted into recording position, the output transformer is connected to feed into the translating device as from the variable tap 85 by way of the pole 75 and contact 75c; the feedback circuit 69 is coupled to the jack 94 for connection to the telegraph key 73 so as to render the oscillation unit operable as a signal generator; and the headphones are connected from the ground side 80 to the tap 85 of the output audio circuits through the volume limiting resistor 112 by way of the pole 78 and contact 78c.

In order that the conditioning of both the translating device and oscillation unit may be coordinated and controlled by a single unitary control means—for example, by the control lever 15—I provide an operative connection between the control lever and the switch 52. This connection comprises the carriage support rod 9 as an operative element thereof and for this reason the rod 9 is suitably journalled in the standards 11 and 12 and the control lever 15 is splined to the rod, the splining of the control lever to the rod being effected by a screw 115 in the hub of the lever which engages a slot 116 provided in the rod longitudinally thereof. At the left end portion of the rod 9—which portion projects beyond the standard 11—there is secured a lever arm 117 to which is pivoted as at 118 one end of a link 119. The other end of this link has a pivoted connection as at 120 to a lever arm 121 secured to a shaft 52a of the switch 52. This switch, being of the rotary type, has the usual threaded hub portion 52b which, in the present case, is extended through the standard 11 and held in place by a nut 122, to provide a mounting for the switch on the standard. The connections to the switch from the oscillation unit, heretofore described, may all be grouped together as in a cable 123.

The provision of a single unitary means to control the conditioning of both the translating device and the oscillation unit greatly simplifies the control of the set and thus its utility. For instance when the set has been conditioned for use as by mounting a record on the mandrel and closing the on-off switch 20 to provide power to the motor M and oscillation unit 50, the operator need only to shift the control lever 15 to recording position and then engage the clutch 22 in order to record a code exercise. When in the course of the recordation of an exercise the operator desires to listen back on his work he need only to shift the control lever 15 first to inoperative position, to back-space the translating device along the record—which is done manually by moving the carriage rearwardly also through the medium of the control lever 15—and thereafter to shift the control lever into reproducing position.

While I have herein illustrated and described the oscillation unit 50 as of a unitary character which is convertible either into an oscillator or an amplifier, it will be understood that with respect to certain aspects of my invention, as for example to a controlling of the set through a single unitary means as above described, the providing of the oscillator and amplifier means in a combined form need not be carried out. Also it will be understood that many changes and modifications may be made in the embodiment herein illustrated and described without departing from the scope of the different aspects of my invention, which I endeavor to express according to the following claims.

I claim:

1. In a system of the character described: the combination of a phonographic translating device and control means associated therewith operable to place the device into recording and other conditions; an oscillation generator; and means, controlled by said control means and operated incidental to the placing of said translating device into recording condition, for rendering said oscillation generator operable and concurrently connecting the output of the same to said translating device.

2. The structure as claimed in claim 1, further including means, effective when said translating device is in recording condition, for starting and stopping at will the feeding of oscillations from said generator into said translating device.

3. In a system of the character described comprising an oscillation amplifying means and a phonographic translating device having recording and reproducing conditions and adapted to feed into said amplifying means when in reproducing condition: the combination of control means associated with said translating device and operable to place the same into either of said respective conditions; oscillation generating means; and unitary means controlled by said control means for causing said generating means to be rendered operable and to be connected to feed into said translating device upon the conditioning of the translating device for recording, and for causing said amplifying means to be rendered operative and to be connected to feed from said translating device upon the conditioning of the translating device for reproducing.

4. In a system of the character described comprising oscillation generating and amplifying means and a phonographic translating device having respective conditions for recording and reproducing: the combination of control means associated with said translating device and operable to place the same into either of its said respective conditions; volume control means for said oscillation generating and amplifying means respectively; and means operatively connected with said control means for causing said generating means to be connected to feed into said translating device and to be subjected to the influence of the said respective control means upon a conditioning of the translating device for recording, and for causing said translating device to feed into said amplifying means with the latter connected so as to be subjected to the influence of its respective control means upon a conditioning of the translating device for reproducing.

5. In a system of the character described comprising an electromechanical translating device adapted for either recording or reproducing: the combination of a circuit arrangement connectable to function either as an amplifier or as an electronic oscillator; circuit means including switch means throwable either to connect said circuit arrangement to function as an oscillator and to feed into said translating device or to function as an amplifier and to be fed from said translating device; and separate volume control means to control the oscillator and amplifier functions of said circuit arrangement, respectively operatively included in said circuit arrangement in response to the said throwing of said switch means.

6. In a system of the character described comprising phonographic means including a record support: the combination of a phonographic translating device included within said phonographic means and selectively conditionable to record on or reproduce from a supported record; electrical circuit means adapted for connection in the system so as to function either as an oscillation amplifier or as an oscillation generator; and means controlled by said translating device for causing said circuit means to feed into the translating device with the circuit means connected to function as an oscillation generator when the translating device is conditioned for recording, and for causing said circuit means to be fed from the translating device with the circuit means connected to function as an oscillation amplifier when the translating device is conditioned for reproducing.

7. A code practice set comprising phonographic means selectively conditionable for recording or reproducing; an electrical circuit arrangement including an electronic discharge device and means controllable to convert said circuit arrangement either into an amplifier or into an oscillator; and means coupling said phonographic means with said circuit arrangement and causing the latter to be converted into an oscillator and amplifier respectively upon a conditioning of the phonographic means for recording and reproducing.

8. In a code practice set: the combination of a phonographic means and means associated therewith to selectively condition the phonographic means for recording or reproducing; an electrical circuit arrangement including an electronic amplifying device; means controllable to convert said circuit arrangement into an amplifier or oscillator; and means coupling said phonographic conditioning means with said circuit converting means for causing one to be operated by the other.

9. In a code practice set: the combination of a phonographic means and means associated therewith to selectively condition the phonographic means for recording or reproducing; an electrical circuit arrangement including an electronic amplifying device and provided with an oscillation transmission channel; control means associated with said circuit arrangement and selectively operable to cause the arrangement to generate oscillations and feed the same out of said channel or to amplify oscillations fed into the channel; and means operatively connecting said control means with said conditioning means, and causing said circuit arrangement to function respectively as an amplifier and oscillation generator when said phonographic means is conditioned for reproducing and recording.

10. In a system of the character described comprising phonographic means provided with a record support: the combination of an electromechanical translating device included within said phonographic means; means selectively operable to condition said translating device to record on or to reproduce from a record on said support; an electrical circuit arrangement including an electronic discharge device and provided with an oscillation transmission channel;

switch means associated with said circuit arrangement and operable to connect the output of said channel to said translating device and concurrently connect said discharge device in the channel to function as an oscillation generator, or to connect the input of said channel to the translating device and concurrently connect the discharge device in the channel to function as an amplifier; and a common control means for both said conditioning means and said switch means.

11. In a system of the character described: the combination of an electromechanical translating device selectively placeable into inoperative condition and respective operative conditions for recording and reproducing; an oscillation circuit arrangement having an input and an output and including an electronic discharge device and circuit means selectively connectable with said discharge device to place the circuit arrangement into inoperative condition and into respective operative conditions wherein the arrangement will function as an oscillation amplifier and as an oscillation generator; and a unitary control means for the system selectively operable to place both said translating device and said oscillation circuit arrangement into inoperative condition, to place said translating device into recording condition and to connect the same to the output of said oscillation circuit arrangement with the latter connected to function as an oscillation generator, or to place said translating device into reproducing condition and to connect the same to the input of said oscillation circuit arrangement with the latter connected to function as an oscillation amplifier.

12. The structure as claimed in claim 6, further including keying means, operatively connected with said circuit arrangement when the same is connected to function as an oscillation generator, for placing said circuit arrangement at will into and out of condition wherein it is effective to generate oscillations and feed the same into said translating device.

13. In a system of the class described: the combination of a circuit arrangement including an electronic discharge device and having an input and an output; and control means associated with said circuit arrangement and selectively operable either to connect said input to said output through said electronic device with the circuit arrangement connected to function as an oscillation amplifier or to connect said electronic device with said output with the circuit arrangement connected to function as an oscillation generator.

14. The structure as claimed in claim 13 further including a key device, associated with said circuit arrangement and rendered effective upon the connecting of the latter to function as an oscillation generator, for placing the circuit arrangement into and out of condition wherein it is effective to generate oscillations and feed the same to said output.

15. In a system of the character described: the combination of an electronic discharge device and circuit means associated therewith; switch means in said circuit means operable to cause said discharge device to function either as an oscillation amplifier or as an oscillation generator; and auxiliary means in said circuit means, effective when said discharge device is connected to function as an oscillation generator, for starting and stopping at will the oscillations generated by the device.

ORVILLE M. DUNNING.